(12) United States Patent
Broder et al.

(10) Patent No.: US 8,522,327 B2
(45) Date of Patent: Aug. 27, 2013

(54) MULTI-STEP CAPTCHA WITH SERIAL TIME-CONSUMING DECRYPTION OF PUZZLES

(75) Inventors: Andrei Broder, Menlo Park, CA (US); Anirban Dasgupta, Berkeley, CA (US); Shanmugasundaram Ravikumar, Sunnyvale, CA (US); Kunal Punera, San Francisco, CA (US)

(73) Assignee: Yahoo! Inc., Sunnyvale, CA (US)

( * ) Notice: Subject to any disclaimer, the term of this patent is extended or adjusted under 35 U.S.C. 154(b) by 203 days.

(21) Appl. No.: 13/206,583

(22) Filed: Aug. 10, 2011

(65) Prior Publication Data
US 2013/0042311 A1   Feb. 14, 2013

(51) Int. Cl.
*H04L 29/06* (2006.01)

(52) U.S. Cl.
USPC .......................................................... 726/7

(58) Field of Classification Search
None
See application file for complete search history.

(56) References Cited

U.S. PATENT DOCUMENTS

| | | | |
|---|---|---|---|
| 2005/0066201 A1* | 3/2005 | Goodman et al. | 713/202 |
| 2006/0036868 A1* | 2/2006 | Cicchitto | 713/182 |
| 2008/0147456 A1 | 6/2008 | Broder | |
| 2009/0113294 A1 | 4/2009 | Sanghavi | |
| 2009/0241201 A1* | 9/2009 | Wootton et al. | 726/28 |
| 2009/0260068 A1* | 10/2009 | Hariharan et al. | 726/7 |
| 2010/0077210 A1 | 3/2010 | Broder | |
| 2010/0180333 A1* | 7/2010 | Bono et al. | 726/13 |
| 2011/0029781 A1* | 2/2011 | Clark et al. | 713/182 |
| 2011/0231913 A1* | 9/2011 | Feng et al. | 726/7 |
| 2011/0271120 A1* | 11/2011 | Kevenaar et al. | 713/189 |
| 2011/0314540 A1* | 12/2011 | Poluri et al. | 726/21 |

\* cited by examiner

*Primary Examiner* — David Pearson
(74) *Attorney, Agent, or Firm* — Michael J. Buchenhorner

(57) ABSTRACT

A system and method for implementing a multi-step challenge and response test includes steps or acts of: using an input/output subsystem for presenting a series of challenges to a user that require said user to correctly solve each challenge before a next challenge is revealed to the user; receiving the user's response to each challenge; and submitting a last response in the series of challenges to a server for validation. The method further includes: using a processor device configured to perform for each challenge in the series of challenges: internally validating the response by comparing the user's response to a correct response; and using the user's response, decrypting the next challenge to reveal the next challenge; wherein the next challenge remains obfuscated until a previous challenge is correctly solved.

20 Claims, 6 Drawing Sheets

MULTI-STEP CAPTCHA WITH SERIAL TIME-CONSUMING DECRYPTION OF PUZZLES

CROSS-REFERENCE TO RELATED APPLICATIONS

None.

STATEMENT REGARDING FEDERALLY SPONSORED-RESEARCH OR DEVELOPMENT

None.

INCORPORATION BY REFERENCE OF MATERIAL SUBMITTED ON A COMPACT DISC

None.

FIELD OF THE INVENTION

The invention disclosed broadly relates to the field of information processing systems, and more particularly relates to the field of Internet security using CAPTCHAs.

BACKGROUND OF THE INVENTION

Spamming is a lucrative business in spite of an extremely small response rate (as defined by the fraction of people who click on spam) because the cost of getting spam messages to users is so low. A key step for spammers in sending cheap spam messages is to use automated means to create millions of fake email accounts on services like Yahoo!. This involves solving CAPTCHAs—puzzles presented by Yahoo! and other Internet sites that are easy for humans to solve, but hard for automated systems to solve.

The term CAPTCHA is short for "Completely Automatic Public Turing Test to Tell Computers and Humans Apart." CAPTCHA is a pattern recognition challenge (test) that a human can easily pass, but is difficult or impossible for a computer to pass. For example, humans are able to read distorted text, but computers cannot. As CAPTCHA systems on Yahoo! properties have become better at weeding out automated solvers, the spammers have taken to outsourcing just the CAPTCHA-solving job of the spamming process to human solvers. These human solvers, typically in third world countries, work from home or in sweatshops and represent a significant fraction of the CAPTCHA-solving traffic at Yahoo! today. Moreover, as the prices charged by "human farms" has been falling steadily, today's going rate for solving 1000 CAPTCHAs is approximately 70 cents. At this low price, we can expect to see steady growth in the human farm activity on Yahoo! systems.

Given that now so much of CAPTCHA solving work for spammers is being done by humans, it is all but impossible to design CAPTCHAs which are easy for legitimate human users and difficult for spammers. Hence the new emphasis in CAPTCHA design work is to make the CAPTCHA more expensive to solve; in particular in terms of how much time it takes to solve it. This will cause human farms to charge more per correctly solved CAPTCHAs, and hence the cost of spamming will increase (making it unsustainable with the current low response rate). Moreover, since legitimate users need to solve a CAPTCHA infrequently, these legitimate users will not mind solving a more time-consuming CAPTCHA.

One known solution to make CAPTCHA-solving more time consuming is to display only a small portion of the image at any one time with the rest occluded. While this works well initially, we expect spammers to attempt attacks on these CAPTCHAs by techniques like speeding up the animation or taking multiple snapshots.

Therefore, there is a need for an improved CAPTCHA-solving technique to thwart the human spammers.

SUMMARY OF THE INVENTION

Briefly, according to an embodiment of the present invention, a method for implementing a multi-step challenge and response test includes steps or acts of: using an input/output subsystem for presenting a series of challenges to a user that require said user to correctly solve each challenge before a next challenge is revealed to the user; receiving the user's response to each challenge; and submitting a last response in the series of challenges to a server for validation. The method further includes: using a processor device configured to perform for each challenge in the series of challenges: internally validating the response by comparing the user's response to a correct response; and using the user's response, decrypting the next challenge to reveal the next challenge; wherein the next challenge remains obfuscated until the previous challenge is correctly solved.

According to another embodiment of the present invention, a system includes: memory; an input/output subsystem, and a processor device, wherein all components are used to implement the multi-step challenge and response test.

According to another embodiment of the present invention, a non-transitory computer readable medium includes instructions for executing the method steps for implementing the multi-step challenge and response test.

According to another embodiment of the present invention, the steps for implementing the multi-step challenge and response test can be performed by a third party validation engine paid to perform the services for an Internet services provider.

BRIEF DESCRIPTION OF THE SEVERAL VIEWS OF THE DRAWINGS

To describe the foregoing and other exemplary purposes, aspects, and advantages, we use the following detailed description of an exemplary embodiment of the invention with reference to the drawings, in which.

Figure 1:
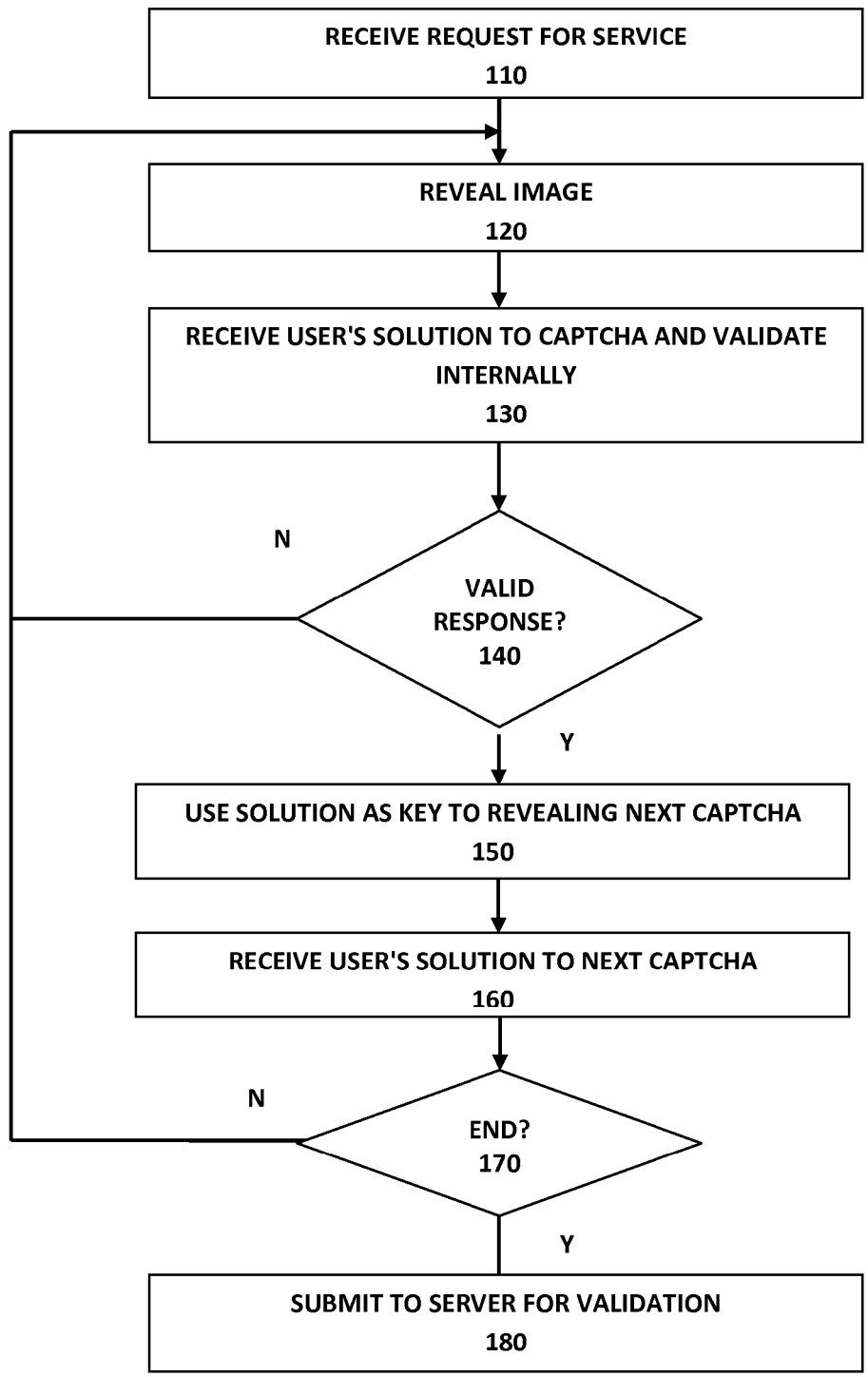
FIG. 1 is a flowchart of a multi-step serial CAPTCHA method according to an embodiment of the invention.

While the invention as claimed can be modified into alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the scope of the present invention.

DETAILED DESCRIPTION

Before describing in detail embodiments that are in accordance with the present invention, it should be observed that the embodiments reside primarily in combinations of method steps and system components related to systems and methods for placing computation inside a communication network. Accordingly, the system components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

Thus we describe a way to ensure that solving the CAPTCHA consumes at least a specific amount of time by forcing the computer to perform some expensive computations. In order to address the problem of human spammers solving CAPTCHAs, we introduce a multi-step serial CAPTCHA puzzle that requires a correct solution to a previous step to decrypt and reveal the next step. In this manner we generate a CAPTCHA that requires the computer to perform time-consuming computations to thwart the human spammer industry. Using the solution of a previous step to decrypt the next step ensures that multiple solvers cannot solve different steps in parallel. Moreover, the expensive computation in between steps allows us to control the minimum amount of time it takes to solve the CAPTCHA. This increases the expense to the human spammers. By making the CAPTCHA more expensive when we do not trust the IP or machine from which the account registration is taking place, we remove the incentive to spam.

Some of the benefits and advantages of the multi-step serial CAPTCHA are as follows:

1. Time deterrent. Because one CAPTCHA must be solved before the next one is revealed, human solvers employed by spammers must take a longer amount of time to solve the multi-step serial CAPTCHA.

2. Performance deterrent. By employing computation-intensive algorithms to decrypt the CAPTCHA challenges, automated spam methods are required to perform exorbitant computations to even view the full CAPTCHA.

3. Solution Assist. Gives legitimate humans clues when their partial solution to the CAPTCHA is not correct. This should reduce wrong answers by legitimate humans.

4. Flexibility. We provide an algorithm to control the amount of minimum time needed to solve the CAPTCHA based on the trust score of the user/IP/machine etc.

5. Mobile-friendly. Because we do not require a server connection for validation of each CAPTCHA step, we reduce the back-end requirement, which is especially critical in the mobile setting.

We now describe one particular instantiation of this general class of CAPTCHAs. We describe our solution in terms of a multi-step serialized CAPTCHA puzzle that presents characters within a distorted background image. The human user must enter the correct characters into an input box. Referring now to FIG. 1 there is shown a flow chart 100 of a multi-step serialized CAPTCHA method according to an embodiment of the present invention. First, in step 110, when the user's browser requests a CAPTCHA (on the registration page) we send it one, two, three or more challenges in step 120. These challenges can be in the form of images which remain obfuscated until a previous challenge is solved. If multiple images are initially displayed, it is assumed that the CAPTCHA will be solved in the reading order which the general population viewing the website uses. For our examples, we assume that the CAPTCHA puzzles will be solved in left to right order.

Figure 2:
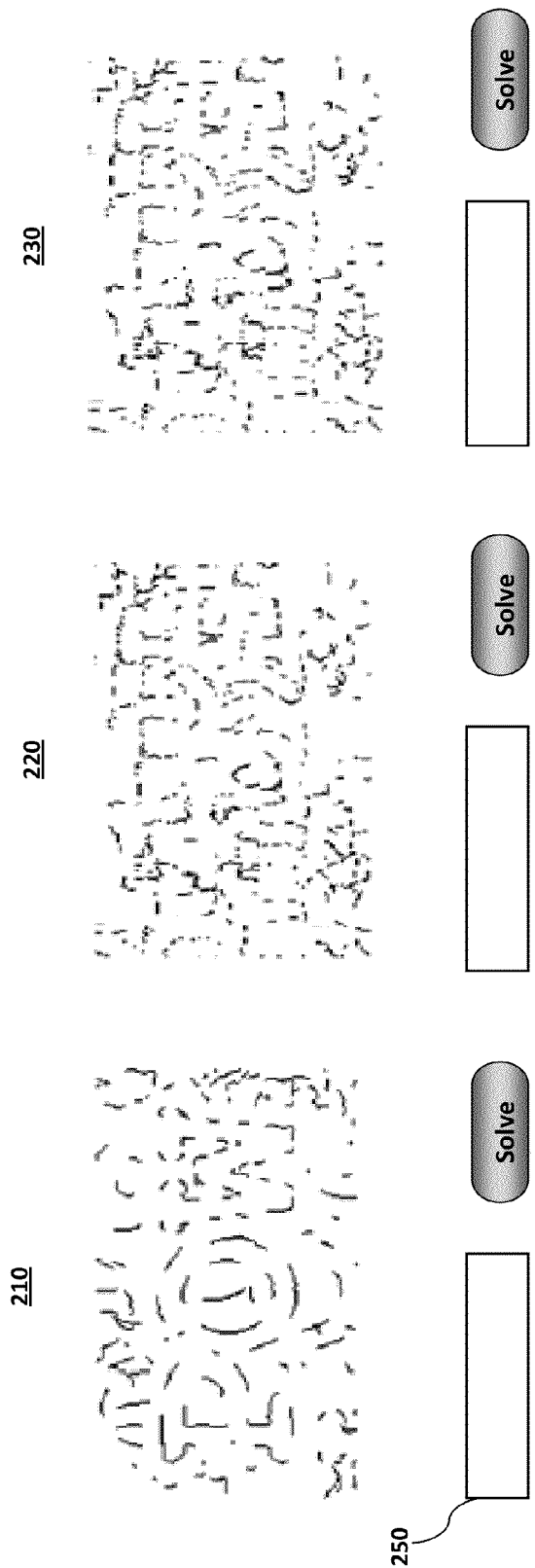
FIG. 2 is an exemplary illustration showing three CAPTCHA puzzles where only the first CAPTCHA is revealed so that a human user can solve it, according to an embodiment of the present invention.

Referring now to FIG. 2, we see that the left challenge 210 (the first CAPTCHA image) displays have a valid CAPTCHA puzzle on it, while the right challenge 220 (the second CAPTCHA image) displays no recognizable characters. The user will enter the solution to the first CAPTCHA image 210 into the input box 250 and we will use this solution as a key to unscramble (using decryption methods) the second CAPTCHA image 220 in step 130. This unscrambling process will involve an expensive computation—factoring a large number into primes or finding the inverse of a MD5 hash key that will take, say, 10 seconds. The MD5 hash, also known as checksum for a file, is a 128-bit value, used like a fingerprint of the file. Other secure hashing schemes can also be used. It should be noted that these are just some examples of computations that can be implemented to decrypt the user's response. If the answer to the first CAPTCHA challenge 210 is correct as determined in decision 140, the second challenge 220 will unscramble to reveal a solvable CAPTCHA puzzle in step 150; else the second challenge 220 will remain obfuscated, not revealing any recognizable characters. At this point, the user is directed to return to the first CAPTCHA challenge 210 and try again.

We ensure that the images with no recognizable characters have similar characteristics (like density, length of components, and the like) as the valid CAPTCHA challenges, since this deprives the spammers from an automated way of checking if the solution to the previous step is correct. Next, the user submits the answer to the decrypted next challenge in step 160. If this is the last challenge to solve, the solution is submitted to the server for validation in step 180. Note that up to this point, the CAPTCHA validation has been performed internally.

If however, the user needs to solve another challenge, then the process loops back to step 120 where the next challenge is revealed. Regardless of the number of CAPTCHA puzzles provided, it is important to note that the user is required to correctly solve one CAPTCHA puzzle before the next CAPTCHA in the sequence can be revealed. The CAPTCHA image will unscramble only upon validating a correct solution to the previous CAPTCHA. It should be noted that any number of CAPTCHA puzzles, within reason, can be provided within the spirit and scope of the invention. Moreover, an embodiment can be implemented wherein only one CAPTCHA is revealed initially and the next CAPTCHA will appear only after correctly solving the previous CAPTCHA.

FIG. 2 shows an exemplary multi-step CAPTCHA screen with three different CAPTCHAs shown at once, with varying levels of occlusion. The process begins with the first CAPTCHA (starting from the left-hand side) and continues to the second and then the third CAPTCHA. You will note that the image in the first CAPTCHA is somewhat obscured, but a human user will be able to discern the letters "POW." In this illustration, the correct solution to the first CAPTCHA 210 is "POW." If the user inputs this correct answer, then the second CAPTCHA 220 can be solved. If the user does not solve the first CAPTCHA 210 correctly, the second CAPTCHA 220 will not be solvable and the user must attempt to solve the first CAPTCHA 210 again before proceeding.

Figure 3:
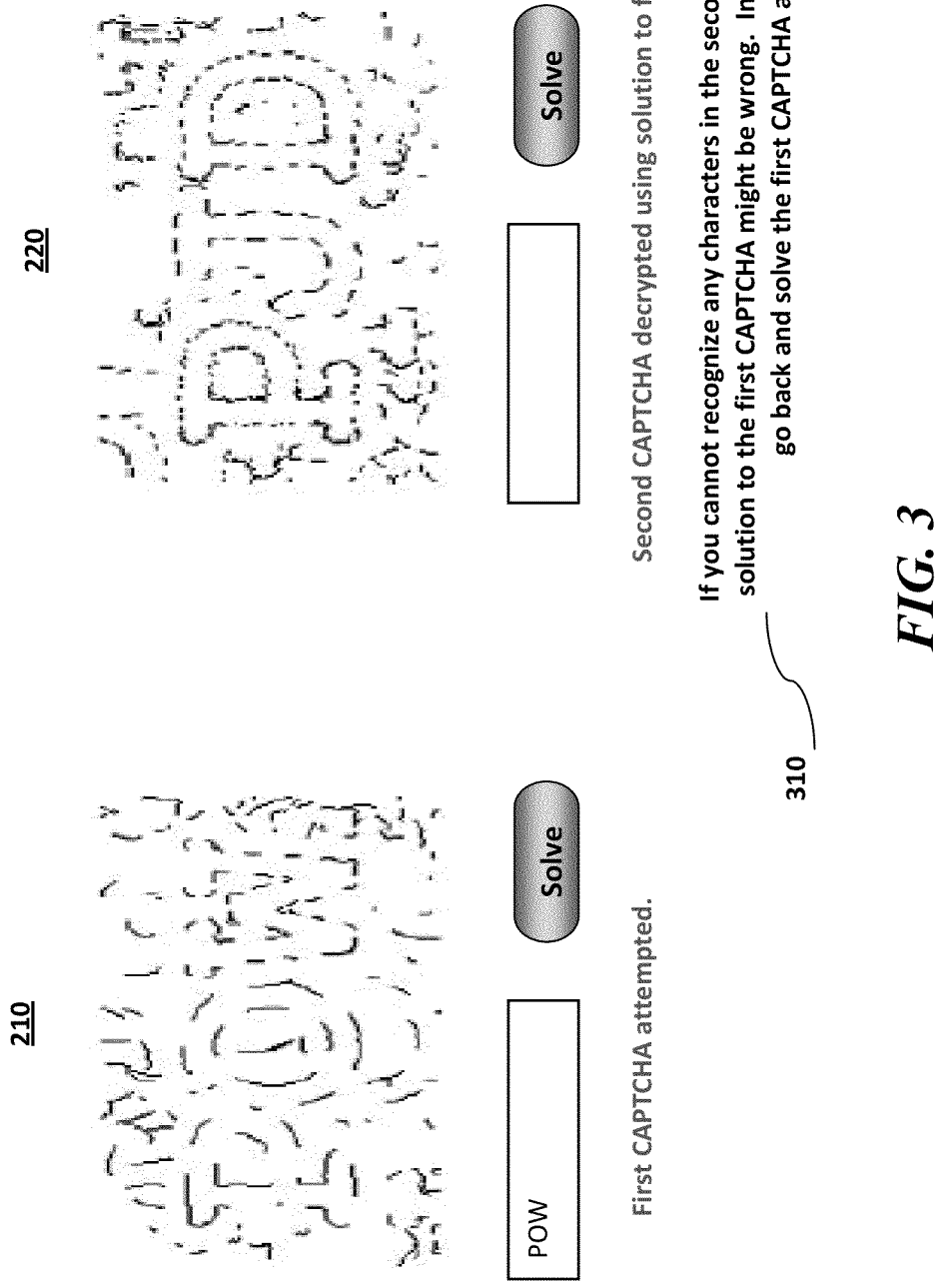
FIG. 3 is an exemplary illustration showing how the second CAPTCHA is revealed when the human user correctly solves the first CAPTCHA puzzle, according to an embodiment of the present invention.

Referring now to FIG. 3, if the user correctly solves the first CAPTCHA 210, the user must solve the next CAPTCHA 220. Note that, associated with the second CAPTCHA 220, instructions 310 are provided to the user that if this CAPTCHA 220 remains too obfuscated to solve, this means that the solution to the previous CAPTCHA 210 was incorrect and the user is directed to try solving the previous CAPTCHA 210 before proceeding.

Figure 4:
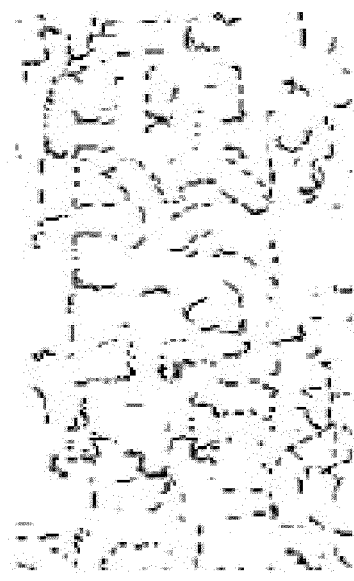
FIG. 4 is an exemplary illustration showing what happens when the human user has not solved the second CAPTCHA correctly, according to an embodiment of the present invention.
Figure 4:
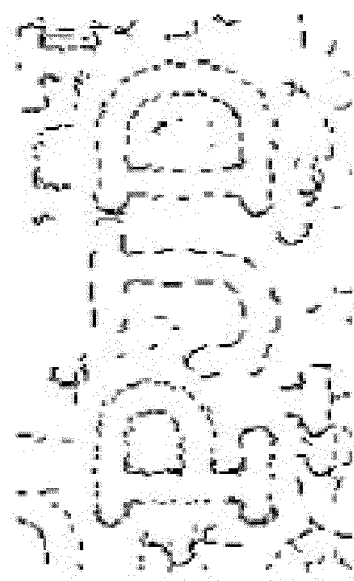
Figure 5:
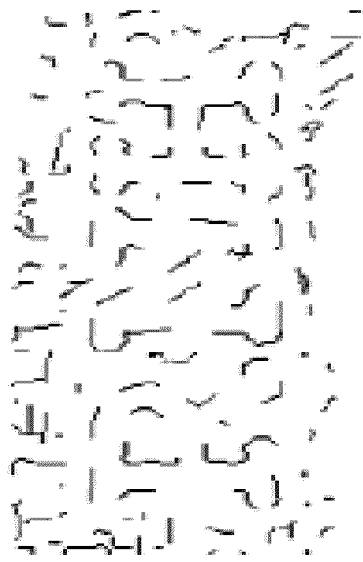
FIG. 5 is an exemplary illustration showing how the third CAPTCHA is decrypted once the human user solves the second CAPTCHA, according to an embodiment of the present invention.

Now with reference to FIG. 4, after correctly solving the first CAPTCHA 210, the user proceeds to solve the second CAPTCHA 220 in order to reveal the image in the third and final CAPTCHA 230 of this series. Here it appears that the user was unable to solve the second CAPTCHA 220. The user will realize this when the third CAPTCHA 230 remains obfuscated as shown in FIG. 4. Directions 410 are provided so that the user can correct his/her mistake and try again. FIG. 5 shows the third CAPTCHA 230 revealed after the user successfully solves the second CAPTCHA 220.

By requiring an expensive computation in between steps, we are able to control the minimum amount of time required to solve a CAPTCHA. This helps us make the CAPTCHA more expensive when we do not trust the IP or machine from which the account registration is taking place. We are able to use known methods to verify the trust score of the requester. Depending on the trust score associated with that requester, we can adjust the amount of computation required to decrypt the user's solution. We can interrogate the trust cookie from the requester to assign a trust score if none is available.

In another embodiment of the present invention, the method steps of FIG. 1 are performed by a third party validation engine for an Internet services provider. In such an arrangement, the third party validation engine could charge a fee for the CAPTCHA validation services. Additionally, the invention can be further monetized by the third party validation engine providing the additional service of adjusting the trust levels of requesters depending on the perceived likelihood of being a spammer and then provide this adjusted trust level to the Internet services provider.

Figure 6:
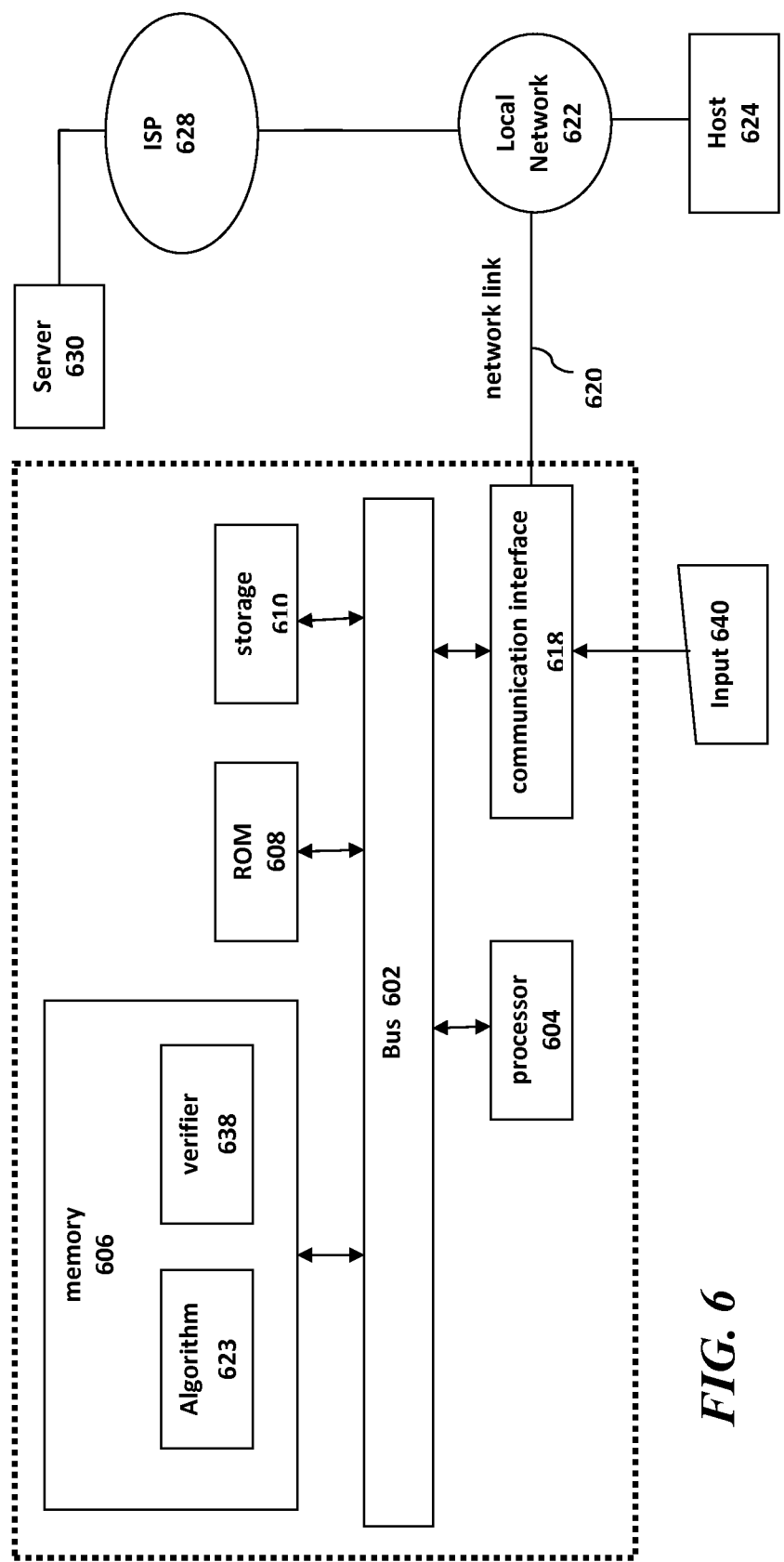
FIG. 6 is a high level block diagram showing an information processing system according to another embodiment of the invention.

Referring now to FIG. 6 there is shown a high-level block diagram illustrating an information processing system 600 upon which an embodiment of the present invention may be implemented. System 600 includes a bus 602 or other communication mechanism for communicating information, and one or more processors, such as processor device 604 coupled with bus 602 for processing information. System 600 also includes a main memory 606, such as a random access memory (RAM) or other dynamic storage device, coupled with bus 602 for storing information and instructions to be executed by processor device 604 for carrying out the steps in the flow chart of FIG. 1.

Memory 606 stores logic for performing the method steps discussed with respect to FIG. 1. Memory 606 can also store the algorithms 623 and computations for applying the series of mathematical operations used to decrypt the CAPTCHAs. The verifier 638 embodies the logic for internally verifying the response input by the computer user.

Main memory 606 also may be used for storing temporary variables or other intermediate information during execution of instructions to be executed by process device 604. System 600 further includes, inter alia, a read only (ROM) memory 608 or other static storage device, coupled with bus 602 for storing static information and instructions for processor device 604. A storage device 610, such as a magnetic disk or optical disk, is provided and coupled with bus 602 for storing information and instructions. The storage 610 can store the correct solutions provided with each instance of the CAPTCHA challenge/response.

In an embodiment of the present invention, computer system 600 is used for implementing validation of a human user. According to one embodiment of the invention, the multi-step CAPTCHA is provided by system 600 in response to processor device 604 executing one or more sequences of one or more instructions contained in memory 606.

System 600 also includes a communication interface 618 providing a two-way communication coupling with a network link 620 that is connected to a local network 622. Examples of a communications interface 618 may include a modem, a network interface (such as an Ethernet card), a communications port, a PCMCIA slot and card, etc. Software and data transferred via communications interface 618 are in the form of signals which may be, for example, electronic, electromagnetic, optical, or other signals capable of being received by communications interface 618. These signals are provided to communications interface 618 via a communications path (i.e., channel). The communications interface 618 further is enabled to receive input 640 from the computer user in response to the challenge provided with the multi-step CAPTCHA.

Network link 620 typically provides data communication through one or more networks to other devices. Network link 620 may provide a connection through local network 622 to a host computer 624 or to a web browser providing access, through the Internet to an Internet services provider 628. Server 630 receive the last challenge response for validation, after the previous challenges have been internally validated by the processor device 604.

It is to be understood, that the examples given in FIGS. 2 through 5 are just an illustration of the general working of the present invention and that only features relevant for the understanding of it are shown. Numerous specific details have been set forth by way of exemplary embodiments in order to provide a more thorough description of the present invention. It will be apparent, however, to one skilled in the art, that the present invention may be practiced without these specific details. In other instances, well-known features have not been described in detail so as not to obscure the invention. The preferred embodiments of the inventions are described herein in the Detailed Description, Figures and Claims. Unless specifically noted, it is intended that the words and phrases in the specification and claims be given the ordinary and accustomed meaning as understood by those of skill in the applicable art. If any other meaning is intended, the specification will specifically state that a special meaning is being applied to a word or phrase.

Therefore, while there has been described what is presently considered to be the preferred embodiment, it will understood by those skilled in the art that other modifications can be made within the spirit of the invention. The above description(s) of embodiment(s) is not intended to be exhaustive or limiting in scope. The embodiment(s), as described, were chosen in order to explain the principles of the invention, show its practical application, and enable those with ordinary skill in the art to understand how to make and use the invention. It should be understood that the invention is not limited to the embodiment(s) described above, but rather should be interpreted within the full meaning and scope of the appended claims.

We claim:

1. A method for implementing a multi-step challenge and response test, said method comprising:
   using an input/output subsystem configured to perform:
      presenting a series of challenges to a user that require said user to correctly solve each challenge before a next challenge is revealed to the user;
      receiving the user's response to each challenge; and
      submitting a last response in the series of challenges to a server for validation;
   using a processor device configured to perform for each challenge in the series of challenges:
      internally validating the response by comparing the user's response to a correct response; and
      using the user's response, decrypting the next challenge to reveal the next challenge such that the user can perceive said next challenge;
      wherein the next challenge remains obfuscated until a previous challenge is correctly solved.

2. The method of claim 1, wherein decrypting the next challenge requires several computing cycles.

3. The method of claim 2 wherein decrypting the next challenge comprises using a secure hashing method.

4. The method of claim 2 wherein the processor device is further configured to perform:
   interrogating a trust score associated with the user; and
   depending on the trust score associated with the user, adjusting an amount of computation required to decrypt the next challenge;
   wherein more computation is required if the user is associated with a low trust score.

5. The method of claim 1 wherein presenting the series of challenges comprises presenting only one challenge at a time;
   wherein the user must correctly solve the presented challenge before the next challenge is revealed.

6. The method of claim 1 wherein presenting the series of challenges comprises presenting two challenges at a time;
   wherein the user must correctly solve a first challenge before the next challenge is revealed.

7. The method of claim 1 wherein presenting the series of challenges comprises presenting three challenges at a time;
   wherein the user most correctly solve the first and second challenges before the next challenge is revealed.

8. The method of claim 1 further comprising storing decryption algorithms used to verify the response.

9. The method of claim 1 further comprising providing instructions to the user to attempt to solve the previous challenge again when said previous challenge remains obfuscated.

10. A system for implementing a multi-step challenge and response test, said system comprising:
    a memory;
    an input/output subsystem configured to perform:
       presenting a series of challenges to a user that require said user to correctly solve each challenge before an image in a next challenge is revealed to the user;
       receiving the user's response to each challenge; and
       submitting a last response in the series of challenges to a server for validation; and
    a processor device operatively coupled with the memory, said processor device configured to perform, for each challenge in the series of challenges:
       internally validating the response by comparing the user's response to a correct response; and
       using the user's response, decrypting the next challenge to reveal the next challenge;
       wherein the image in the next challenge remains obfuscated until a previous challenge is correctly solved.

11. The system of claim 10 wherein the memory stores decryption algorithms that require several computing cycles to decrypt a challenge before the next challenge is revealed.

12. The system of claim 10 wherein the processor device is further configured to perform:
    interrogating a trust score associated with the user; and
    depending on the trust score associated with the user, adjusting an amount of computation required to decrypt the next challenge;
    wherein more computation is required if the user is associated with a low trust score.

13. The system of claim 10 wherein the processor device is further configured to provide instructions to the user to attempt to solve the previous challenge again when the previous challenge remains obfuscated.

14. The system of claim 10 wherein the input/output subsystem presents only one challenge at a time;
    wherein the user must correctly solve the previous challenge before the next challenge is decrypted and revealed.

15. The system of claim 10 wherein the input/output subsystem presents two challenges at a time;
    wherein the user must correctly solve the previous challenge before the next challenge is decrypted and revealed.

16. The system of claim 10 wherein the input/output subsystem presents three challenges at a time;
    wherein the user must correctly solve the first and second challenges in that order before the next challenge is decrypted and revealed.

17. A non-transitory computer program product for implementing a multi-step challenge and response test, said computer program product comprising instructions which, when executed by a computer, cause the computer to perform steps of:
    presenting a series of challenges to a user that require said user to correctly solve each challenge before a next challenge is revealed to the user;
    for each challenge in the series of challenges:
       receiving the user's response to each challenge;
       internally validating the user's response by comparing said user's response to a correct response;
       using the user's response, decrypting the next challenge to reveal the next challenge;
       wherein the next challenge remains obfuscated until a previous challenge is correctly solved; and
    submitting a last response in the series of challenges to a server for validation.

18. The non-transitory computer program product of claim 17 further comprising instructions for storing the correct response.

19. The non-transitory computer program product of claim 17 further comprising instructions for:
    interrogating a trust score associated with the user; and
    depending on the trust score associated with the user, adjusting an amount of computation required to decrypt the next challenge;
    wherein more computation is required if the user is associated with a low trust score.

20. The non-transitory computer program product of claim 19 further comprising instructions for:
    adjusting the trust score associated with the user based on the challenge response test; and providing the adjusted trust score to an Internet services provider.

\* \* \* \* \*